US012562993B2

(12) United States Patent
Shah et al.

(10) Patent No.: US 12,562,993 B2
(45) Date of Patent: Feb. 24, 2026

(54) PACKET FRAGMENTATION PREVENTION IN AN SDWAN ROUTER

(71) Applicant: Cisco Technology, Inc., San Jose, CA (US)

(72) Inventors: Avinash Shah, Pleasanton, CA (US); Ganesh Devendrachar, Milpitas, CA (US); Arul Murugan Manickam, San Jose, CA (US); Laxmikantha Reddy Ponnuru, San Ramon, CA (US); Satyajit Das, Lake Tapps, WA (US); Pritam Baruah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 231 days.

(21) Appl. No.: 18/208,165

(22) Filed: Jun. 9, 2023

(65) Prior Publication Data

US 2024/0414094 A1 Dec. 12, 2024

(51) Int. Cl.
H04L 47/36 (2022.01)

(52) U.S. Cl.
CPC .................................... H04L 47/36 (2013.01)

(58) Field of Classification Search
None
See application file for complete search history.

(56) References Cited

U.S. PATENT DOCUMENTS

2005/0281288 A1* 12/2005 Banerjee ................. H04L 47/36
370/477
2009/0316574 A1* 12/2009 Winter .................... H04L 45/00
370/410

2012/0281559 A1* 11/2012 Ner ........................ H04W 28/06
370/252
2017/0019344 A1 1/2017 Przygienda et al.
2017/0302584 A1 10/2017 Raj et al.
2018/0198723 A1* 7/2018 Attarwala ............... H04L 47/36
2019/0312820 A1 10/2019 Yu et al.

FOREIGN PATENT DOCUMENTS

CN 102291318 12/2011

OTHER PUBLICATIONS

VMware VMware SD-WAN 4.0 2020.

* cited by examiner

*Primary Examiner* — Tonia L Dollinger
*Assistant Examiner* — Ishrat Rashid
(74) *Attorney, Agent, or Firm* — Lee & Hayes, P.C.

(57) ABSTRACT

Techniques are described for detecting a change in Path Maximum Transfer Unit (PMTU) in a network and initiating a PMTU discovery process. A Bidirectional Forwarding Detection (BFD) data packet is generated having enhanced headers configured to record a largest packet sent value and a largest packet received value. The BFD data packet is sent from a first network device (such as a first router) to a second network device (such as a second router). A largest packet sent value and a largest packet received value are each recorded in the BFD data packet. If the largest data packet sent value is larger than the largest data packet received value, then a determination can be made that a path change has resulted in a reduction in PMTU which has resulted in either a data packet being fragmented, a data packet being dropped or both. A PMTU discovery can then be performed.

20 Claims, 10 Drawing Sheets

600

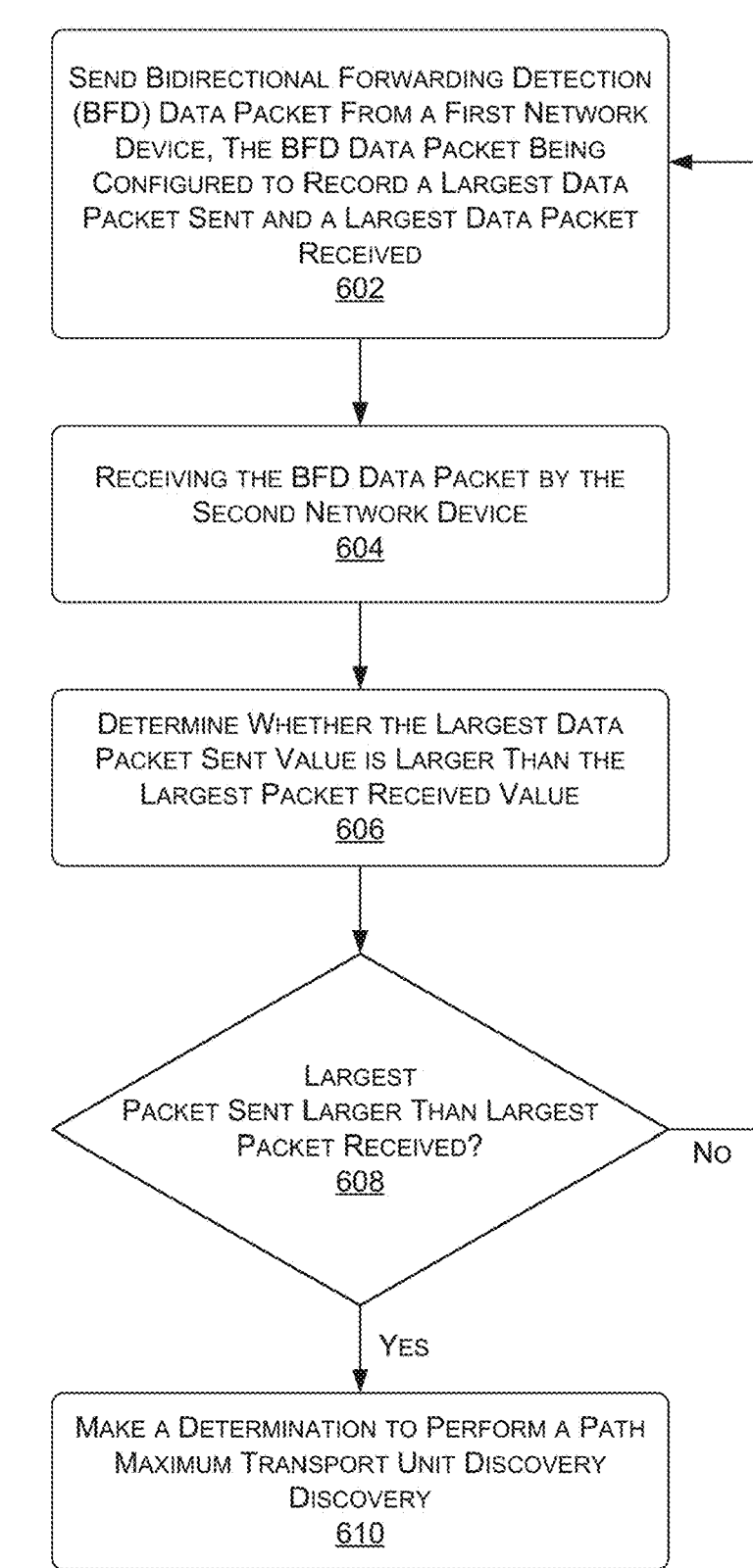

SEND BIDIRECTIONAL FORWARDING DETECTION (BFD) DATA PACKET FROM A FIRST NETWORK DEVICE, THE BFD DATA PACKET BEING CONFIGURED TO RECORD A LARGEST DATA PACKET SENT AND A LARGEST DATA PACKET RECEIVED
602

RECEIVING THE BFD DATA PACKET BY THE SECOND NETWORK DEVICE
604

DETERMINE WHETHER THE LARGEST DATA PACKET SENT VALUE IS LARGER THAN THE LARGEST PACKET RECEIVED VALUE
606

LARGEST PACKET SENT LARGER THAN LARGEST PACKET RECEIVED?
608

No

YES

MAKE A DETERMINATION TO PERFORM A PATH MAXIMUM TRANSPORT UNIT DISCOVERY DISCOVERY
610

FIG. 6

PACKET FRAGMENTATION PREVENTION IN AN SDWAN ROUTER

TECHNICAL FIELD

The present disclosure relates generally to Path Maximum Transfer Unit (PMTU) discovery, and more particularly to techniques for determining that a path change has resulted in a reduction in PMTU and, in response, initiating a PMTU discovery process.

BACKGROUND

Software Defined Wide Area Network (SD-WAN) is a software defined approach to managing a WAN such as the Internet. Advantages of SD-WAN include reducing cost with transport independence across MPLS, 4G/5G, LTE, and other connection types. SD-WAN also improves application performance and increases agility. SD-WAN can optimize user experience and efficiency for Software as a Service (Saas) and public cloud applications. SD-WAN can also simplify operations with automation and cloud-based management.

In a typical SD-WAN router, the transport link's Path Maximum Transfer Unit (PMTU) fluctuates. If data packets egressing from the SD-WAN router exceed the PMTU, the data packet can be fragmented into multiple data packets having transfer unit lower than the egress link's PMTU. When the fragmented data packets reach their destination, they must then be reassembled or de-fragmented. Fragmenting and defragmenting is a is a heavy, costly, and time-consuming operation. Fragmenting and defragmenting the data packets puts processing load on "state full" features like DPI, SNORT FW as the fragmented packet have to be fully reassembled for their functionality to work. In addition, due to processing needed to fragment and reassemble the data packets fragmentation induces jitter.

Packet fragmentation is only possible if the router through which the data packet is egressing has this feature or has this feature and has it enabled. If the router does not support packet fragmentation, or if the router does support packet fragmentation but has this feature turned off, the packet will simply be dropped leading to loss of data.

In an SD-WAN router having multiple egress links (e.g. three egress links) each link can have different PMTU values which as described above can change over time. The routing of data flows through the egress links can be determined by an Application Aware Routing (AAR) algorithm. Because the egress link for a data flow is chosen by AAR, long data flows can be "sticky" to a particular egress link. If that data flow tends to have a lot of data packets that exceed the PMTU of the egress link chosen by the AAR algorithm, that data flow can have an excessively high rate of fragmentation, leading to performance problems.

A particular network path has a particular PMTU, and generally data packet sizes are limited to sizes no greater than that PMTU value. However, a network path change, such as from a faulty link in the original network path, can result in a reduction in PMTU. This can result in data packets being fragmented or dropped until a PMTU discovery process is performed to discover the new; lower PMTU. Generally, the amount of time between PMTU discovery processes can be about 20 minutes, which can result in a substantial amount of data fragmentation or data packet drop during that duration.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram for a method according to an embodiment for determining whether to initiate a Path Maximum Transfer Unit (PMTU) discovery.

DESCRIPTION OF EXAMPLE EMBODIMENTS

Overview

Figure 1:
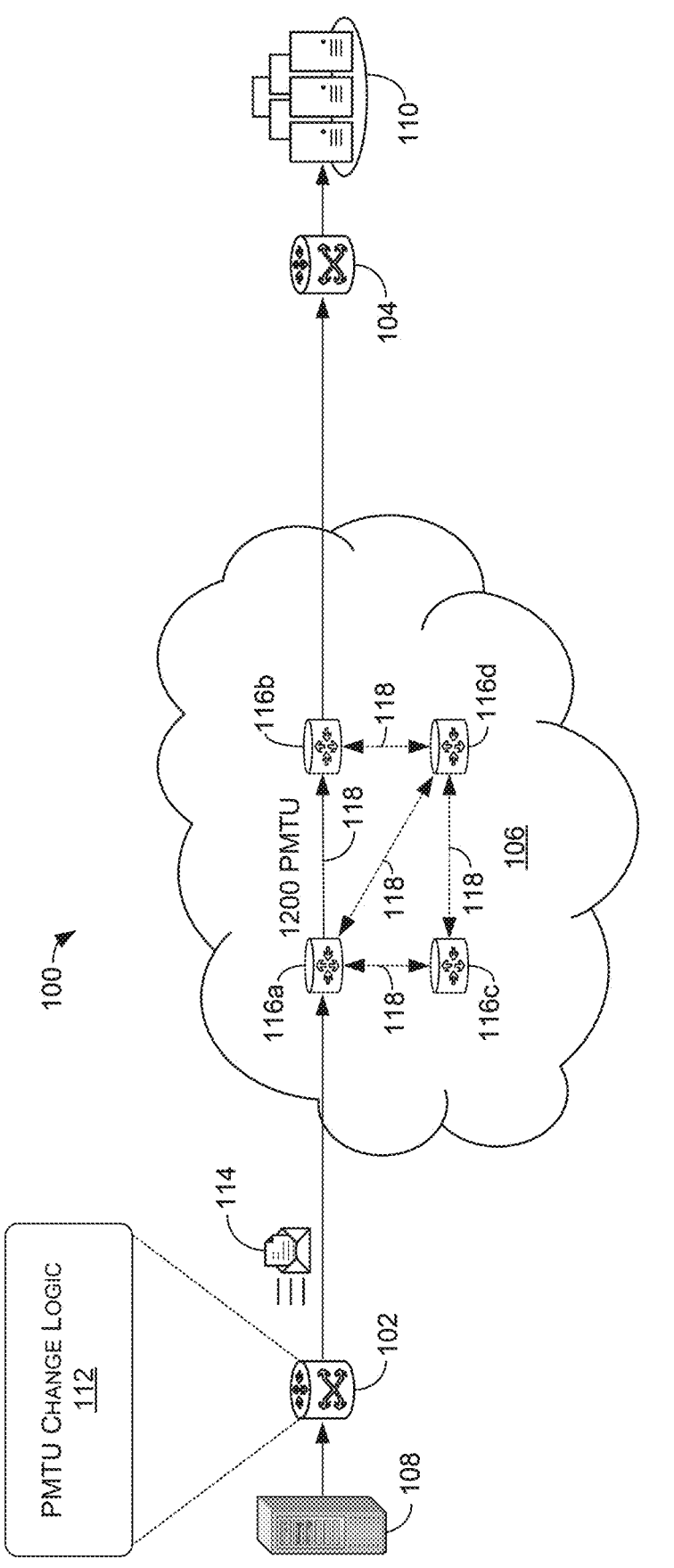
FIG. 1 illustrates a schematic of a network architecture including edge routers connected by a network according to an embodiment and including logic for detecting a possible PMTU value change.

Embodiments described herein provide techniques for detecting a network path change that has resulted in a reduction in Path Maximum Transfer Unit (PMTU). A Bidirectional Forwarding detection (BFD) data packet is sent over a network from a first network device to a second network device. The BFD data packet is configured to record a largest data packet sent value and a largest data packet received value. The BFD data packet is received by the second network device. A determination is then made as to whether the largest data packet sent value is larger than the largest data packet received value. If the largest data packet sent value exceeds the largest data packet received value, then a determination is made to perform a Path Maximum Transfer Unite (PMTU) discovery.

Additionally, the techniques described herein may be performed by a system and/or device having non-transitory computer-readable media storing computer-executable instructions that, when executed by one or more processors, performs the method described above.

Example Embodiments

A Software Defined Wide Area Network (SD-WAN) is a wide area network that uses software-defined network technology, such as communicating over the Internet using overlay tunnels which are encrypted when destined for internal organization locations. If standard tunnel setup and configuration messages are supported by all of the network hardware vendors, SD-WAN simplifies the management and operation of a WAN by decoupling the networking hardware from its control mechanism. This concept is similar to how software-defined networking implements virtualization technology to improve data center management and operation. In practice, proprietary protocols are used to set up and manage an SD-WAN, meaning there is no decoupling of the hardware and its control mechanism.

A key application of SD-WAN is to allow companies to build higher-performance WANs using lower-cost and commercially available Internet access, enabling businesses to partially or wholly replace more expensive private WAN connection technologies such as Multiprotocol Label Switching (MPLS). When SD-WAN traffic is carried over the Internet, there are no end-to-end performance guarantees. Carrier MPLS VPN WAN services are not carried as Internet traffic, but rather over carefully controlled carrier capacity, and can come with an end-to-end performance guarantee.

WANs were important for the development of networking technologies in general and were for a long time one of the most important applications of networks both for military and enterprise applications. The ability to communicate data over large distances was one of the main driving factors for the development of data communications technologies, as it made it possible to overcome the distance limitations, as well as shortening the time necessary to exchange messages with other parties.

Legacy WAN technologies allowed communication over circuits connecting two or more endpoints. Earlier technologies supported point-to-point communication over a slow speed circuit, usually between two fixed locations. As technology evolved, WAN circuits became faster and more flexible. Innovations like circuit and packet switching allowed communication to become more dynamic, supporting ever-growing networks.

The need for strict control, security and quality of service meant that multinational corporations were very conservative in leasing and operating their WANs. National regulations restricted the companies that could provide local service in each country, and complex arrangements were necessary to establish truly global networks. All of that changed with the growth of the Internet, which allowed entities around the world to connect to each other. However, over the first years, the uncontrolled nature of the Internet was not considered adequate or safe for private corporate use.

Independent of safety concerns, connectivity to the Internet became a necessity to the point where every branch required Internet access. At first, due to safety concerns, private communications were still done via a private WAN, and communications with other entities (including customers and partners) moved to the Internet.

As the Internet grew in reach and maturity, companies started to evaluate how to leverage it for private corporate communications. Eventually, application delivery over the WAN became an important topic of research and commercial innovation. Over the next decade, increasing computing power made it possible to create software-based applications that were able to analyze traffic and make informed decisions in real time, making it possible to create large-scale overlay networks over the public Internet that could replicate all of the functionality of legacy WANs at a fraction of the cost.

SD-WAN combines several technologies to create full-fledged private networks, with the ability to dynamically share network bandwidth across the connection points. Additional enhancements include central controllers, zero-touch provisioning, integrated analytics and on-demand circuit provisioning, with some network intelligence based remotely in the cloud, allowing centralized policy management and security.

Networking publications started using the SD-WAN to describe this networking trend. With the rapid shift to remote work, SD-WAN grew in popularity as a way of connecting remote workers.

WANs allow companies to extend their computer networks over large distances, connecting remote branch offices to data centers and to each other and delivering applications and services required to perform business functions. Due to the physical constraints imposed by the propagation time over large distances, and the need to integrate multiple service providers to cover global geographies, WANs face important operational challenges including: network congestion: packet delay variation: packet loss; and even service outages. Modern applications such as Voice over Internet Protocol (VOIP), videoconferencing, streaming media, and virtualized applications and desktops require low latency. Bandwidth requirements are also increasing, especially for applications featuring high-definition video. It can be expensive and difficult to expand WAN capability with corresponding difficulties related to network management and troubleshooting. SD-WAN products can be physical appliances or software based only.

SD-WAN architecture can include an SD-WAN Edge, SD-WAN Gateway, SD-WAN Controller and an SD-WAN Orchestrator. The SD-WAN edge is a physical or virtual function that is placed at an organization's branch, regional, or central office site, data center, in public or private cloud platforms. SD-WAN Gateways provide access to the SD-WAN service in order to shorten the distance to cloud-based services or the user and reduce service interruptions. A distributed network of gateways may be included in an SD-WAN service by the vendor or setup and maintained by the organization using the service. By sitting outside the headquarters in the cloud, the gateway also reduces traffic of the headquarter.

The SD-WAN orchestrator is a cloud hosted or on-premises web management tool that allows configuration, provisioning and other functions when operating an SD-WAN. It simplifies application traffic management by allowing central implementation of an organization's business policies. The SD-WAN controller functionality, which can be placed in the Orchestrator or in the SD-WAN Gateway, is used to make forwarding decisions for application flows. Application flows are IP packets that have been classified to determine their user application or grouping of applications to which they are associated. The grouping of application flows based on a common type, e.g., conferencing applications, is referred to as an Application Flow Group (AFG). The SD-WAN Edge classifies incoming IP packets at the SD-WAN User Network Interface (UNI), determines which application flow the IP packets belong to, and then applies the policies to block the application flow or allow the application flows to be forwarded based on the availability of a route to the destination on a remote SD-WAN Edge. This helps to ensure that the application meets its Service Level Agreements (SLAs).

FIG. 1 is a schematic illustration of a network architecture 100 including techniques for detecting a network change requiring a Path Maximum Transfer Unit (PMTU) discovery. The network architecture 100 includes first and second routing devices 102, 104 connected over a computer network 106. In one embodiment, the routing devices 102, 104 can be edge routers. The computer network 106 can be a Wide Area Network (WAN) such as the Internet. The edge routing devices 102, 104 can be network routers or switches, and can first computer device 108 with a second computer device 110. In one embodiment, the first computer device 108 can be an edge computing device. In one embodiment, the computer device 108 can be a computer device associated with a remote workstation such as a laptop or desktop computer. In another device, the first computer device 108 can be a remote office site, such as a branch office. The second user device 110 can be a device or devices associated with an enterprise, such as a business enterprise, government entity, campus, etc. In one embodiment, the second user device 110 can be a data center or similar entity.

At least one of the routing devices 102 includes PMTU Change Logic 112. The PMTU Change Logic 112 uses a Bidirectional Forwarding Detection (BFD) data packet (BFD data packet) 114 to gather information about the routing of data through the network 106. The BFD data packet 114 has a header extension that is specially modified to detect network path changes leading to a reduction in a path through the network 106. The BFD data packet 114 and its specially configured header extension will be described in greater detail herein below. The BFD data packet 114 is configured to record the largest data packet sent by the edge routing device 108 and the largest data packet received by the edge routing device 104. If the largest packet sent is larger than the largest packet received, the BFD data packet 114 records this. The PMTU Change Logic 112 records this and determines that a path change has occurred through the network 106, requiring a PMTU discovery. The PMTU Change Logic can then initiate a PMTU discovery process and can adjust the size of data packet sent accordingly to prevent packet fragmentation or packet drops, as will be seen.

The network 106 has a plurality of network switches or routers 116. While the network 106 can employ routers or network switches more generally, for purposes of clarity and consistency these devices will be referred to herein as routers 116, although they could be other types of routing devices or switches. There are several possible connections 118 between routers 116. As shown in FIG. 1, the route between the edge networking device 108 to edge routing device passes through the network 106 from router 116a to router 116b. This path has a Path Maximum Transfer Unit (PMTU). By way of example, in this embodiment, the path between router 116a and router 116b has a PMTU of 1200. This is the largest data packet size that can be routed from router 116a to router 116b. In some embodiments, routing protocols such as Internet Protocol version 6 (IPv6) can be used to choose this path. IPv6 can choose this path by determining that this path is the most efficient path in terms of time, cost, etc. In addition, the determination that this is the most efficient path can include a determination that the PMTU 1200 allows sufficiently large data packet size to be routed along this path for maximizing efficiency. In one embodiment, routing device 102 includes logic that can recognize that the PMTU is 1200 and limit the size of data packets sent to be no larger than 1200.

Figure 2:
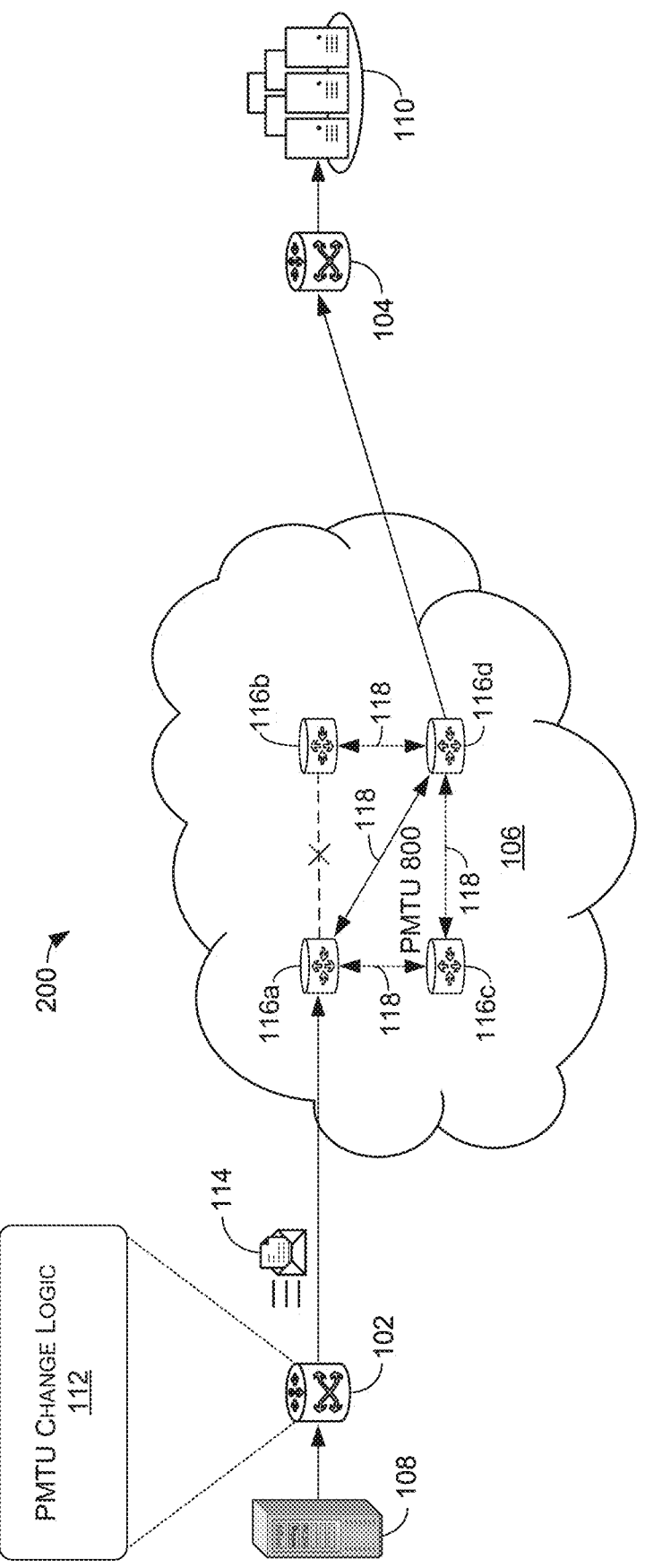
FIG. 2 illustrates a schematic of a network architecture including edge routers connected by a network according to an embodiment including logic for detecting a possible PMTU value change, wherein a network path has changed due to a network connection failure.

FIG. 2 is a schematic showing a network architecture 200 similar to the network architecture 100 of FIG. 1. The network architecture includes edge network devices 102, 104 that are connected over the network 106. The routing devices 102, 104 provide a secure connection between computer devices 108, 110. As with the embodiment of FIG. 1, the network 106 includes routers 116(a-d). The routers 116(a-d) are connected with one another through network connections 118. However, as shown in FIG. 2, the connection between routers 116a and 116b has been dropped. This can be due to a router failure, a defect in the link between the routers, etc. As a result, the connection between routers 116a and 116b is no longer available.

In order to continue routing data from the routing device 102 to routing device 104, data can be rerouted so that it travels from through the network 106 from router 116a to router 116. Referring back to FIG. 1, the routing data through the network from router 116a to router 116b provided a Path Maximum Transfer Unit (PMTU) of 1200 bytes. This meant that the routing device 102 could send data packets as large as 1200 bytes without those data packets being fragmented or dropped. However, as seen in FIG. 2, rerouting the data so that it passes from router 116a to router 116d results in a reduced PMTU of only 800 bytes. However, the routing device 102 without being aware of the reduced PMTU will send data packets as large as 1200 bytes.

When a packet larger than 800 bytes reaches router 116a and is to be routed to router 116d it must either be fragmented or dropped all together. Not all routers support data packet fragmentation, and even a router that does support fragmentation may be configured or set to not perform packet fragmentation. In that case (router 116a does not support fragmentation or is set to not perform fragmentation) any data packet greater than 800 will just be dropped, leading to data loss. On the other hand, if the router 116a does support fragmentation and is set to perform fragmentation, then any data packet larger than 800 bytes will be fragmented. This requires that fragmented data packet be de-fragmentated at the destination (e.g., at network edge device 104). Fragmentation and de-fragmentation results in a significant reduction in performs as a result of the time required to fragment and de-fragment the packets.

PMTU discovery can be performed to detect what the current PMTU is through the network 106. Such a PMTU discovery process can determine that the PMTU has changed from 1200 bytes to 800 bytes, so that the routing device 102 can adjust the size of data packet sent to no more than 800 bytes. However, without any way to know that the path has changed leading to a reduction in PMTU, there is no way to know that a PMTU discovery needs to be performed. PMTU discovery is relatively time consuming and requires a large amount of CPU processing. As a compromise, PMTU discovery can be performed periodically, for example every 20 minutes. However, this means that if the network path has changed as described above, quite a bit of data loss or data fragmentation can occur before the PMTU discovery has detected the reduction in PMTU.

The PMTU Change Logic 112 of the routing device 102 provides logic and circuitry for detecting that a change in PMTU has occurred, allowing the PMTU discovery to be performed as soon as a path change has resulted in PMTU reduction. Therefore, PMTU discovery can be performed immediately or soon after a change in network path has resulted in a reduction in PMTU, thereby preventing a data loss or data fragmentation.

The routing device 102 sends the BFD data packet 114 through the network 106 to the edge network routing device 104. The BFD data packet 114 is then sent from the edge networking device 104 back to the routing device 102. As mentioned above, the BFD data packet 114 has a header that includes fields for recording a value of the size of the largest packet sent by the routing device 102 as well as a value for the size of the largest packet received by the edge network routing device 104. If no network path change has occurred and the PMTU has not changed (as in the case described with reference to FIG. 1) then largest packet sent value will be the same as the largest packet received value. If, on the other hand, there has been a path change resulting in a reduction in PMTU (as in the case discussed with reference to FIG. 2), then the largest packet sent value will not be the same as the largest packet received value. In that case, the largest packet sent value will be larger than the largest packet received value. This indicates that at least one packet has either been fragmented or has been dropped altogether.

The PMTU Change Logic 112 is functional to analyze the largest packet sent value verses the largest packet received value. If the largest packet sent value is not the same as the largest packet received value, the PMTU Change Logic is functional to determine that a PMTU discovery should be performed. In some embodiments, the PMTU Change Logic can also be functional to initiate a PMTU discovery. In some embodiments, the PMTU Change Logic 112 can also be functional to generate the BFD data packet 114 having the header with fields for recording the largest packet sent value and largest packet received value.

Figure 3:
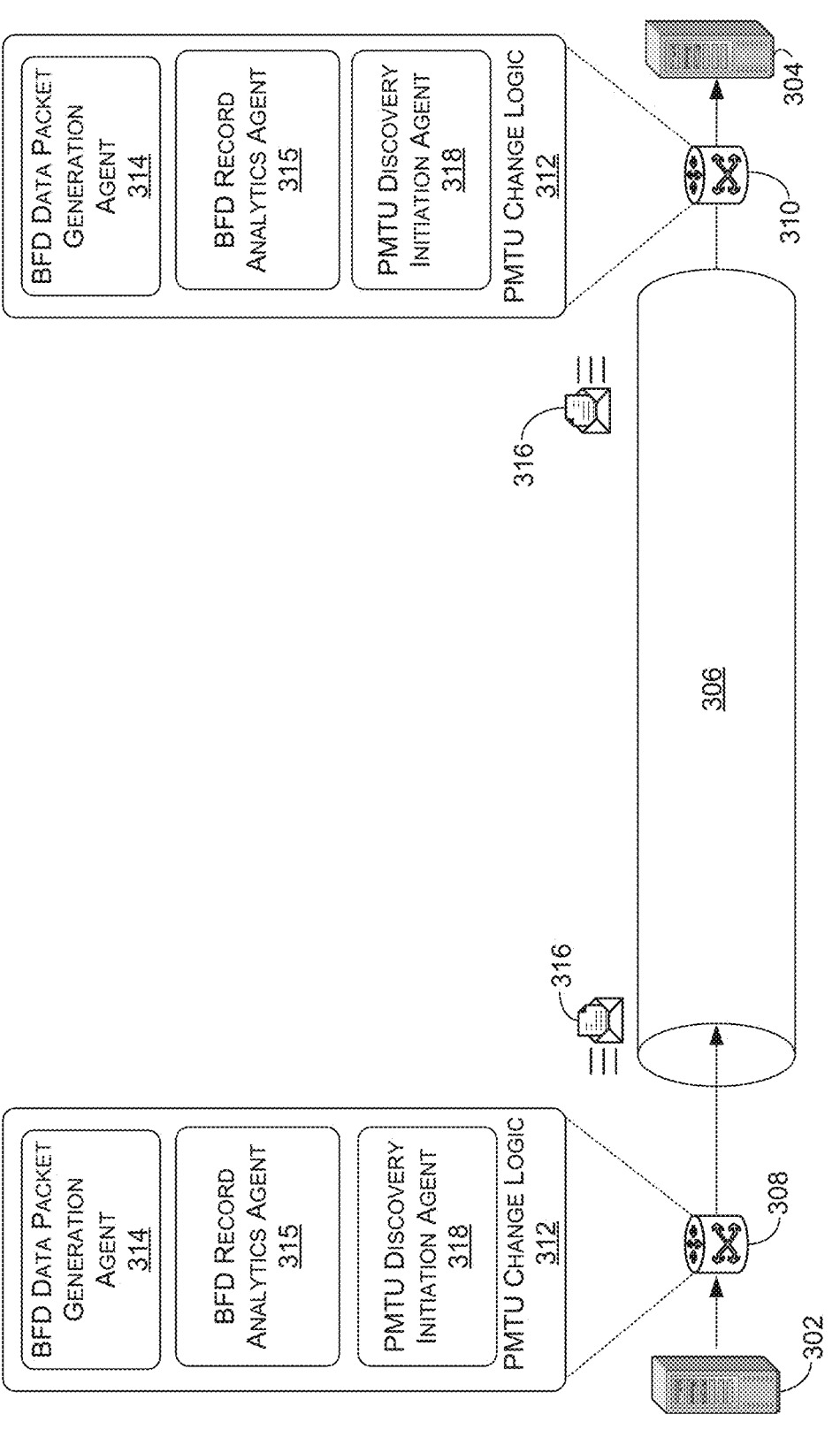
FIG. 3 illustrates network architecture wherein a pair of edge routers are connected by a data tunnel and including logic for detecting a change in PMTU through the data tunnel.

FIG. 3 is a schematic illustration of a computer architecture 300 providing secure data transmission between devices 302, 304. Data transmission can be through a secure virtual data tunnel 306 such as a Software Defined Wide Area Network (SDWAN) data transmission environment. Each of the devices 302, 304 can be one of various types of computer devices, such as but not limited to a server, desktop computer, laptop computer, data center, local area network system, etc.

The devices 302, 304 can connect with each other via the data tunnel 306 by connecting with routers 308, 310. At least one of the routers 308, 310 includes PMTU Change Logic 312. In the embodiment show in FIG. 3, both of the routers 308, 310 includes the PMTU Change Logic 312. The PMTU Change Logic 312 includes logic and circuitry for detecting that the PMTU for data routed through the data tunnel 306 has changed to from a first PMTU value to a second PMTU value that is lower than the first PMTU value. The PMTU change logic can then initiate a PMTU discovery to determine what the second PMTU value is. The router 308, 310 can then adjust the size of data packets sent in order to avoid packet fragmentation or packet drop.

The PMTU Change Logic 312 includes a BFD Data Packet Generation Agent 314. The BFD Data Packet Generation Agent is functional to generate a BFD data packet 316 that is specially configured to have a header field extension that is configured to record a largest packet sent value and a largest packet received value.

In one example implementation, the router 308 sends the BFD Data Packet from the router 308 through the data tunnel 306 to the router 310. BFD data packet 316 records a largest packet sent value corresponding to the value of the largest data packet sent from the router 308. The BFD data packet 316 is received by the router 310. The BFD data packet records a largest data packet received value corresponding to the value of the largest data packet received by the router 310. The router 310 then returns the BFD data packet 316 sending the BFD data packet from the router 310 through the data tunnel 306 back to the router 308.

The PMTU Change Logic also includes a BFD Record Analytics Agent 315. When the router 308 receives the returned BFD data packet 316, the BFD Record Analytics Agent 315 analyzes the modified packet header of the BFD data packet to read and compare the largest packet sent value and largest packet received value. If the largest packet sent value is larger (e.g., exceeds) the largest packet received value, then this indicates that at least one data packet has either been fragmented or has been dropped altogether. This, therefore, indicates that a path change through the data tunnel 306 has resulted in a reduction in the Path Maximum Transfer Unit (PMTU) for the path between the router 308 and router 310. In response to determining that the PMTU has changed, the BFD Record Analytics Agent 315 can determine that a PMTU discovery process should be initiated. The BFD Record Analytics Agent 315 can then employ a PMTU Discovery Initiation Agent 318 to perform a PMTU discovery process. The PMTU discovery process can determine that value of the new, lower, PMTU. The router 308 can then modify (e.g., reduce) the size of data packets sent to ensure that sent data packet do not exceed the new, lower, PMTU and to ensure that data packets are not fragmented or dropped.

On the other hand, if the BFD Record Analytics Agent 315 determines that the largest packet sent value is the same as the largest packet received value, then the BFD Record Analytics Agent 315 can determine that there has not been a path change resulting in a reduction in PMTU. In this case, a PMTU discovery process does not need to be employed and the PMTU Discovery Agent 318 does not need to be engaged, unless a PMTU discovery should be performed based on regularly scheduled time interval having passed, such as for example, every 20 minutes.

This process can be repeatedly performed by generating and sending modified BFD data packets 316 to determine whether to determine whether a path change has resulted in a lower PMTU.

Figure 4:
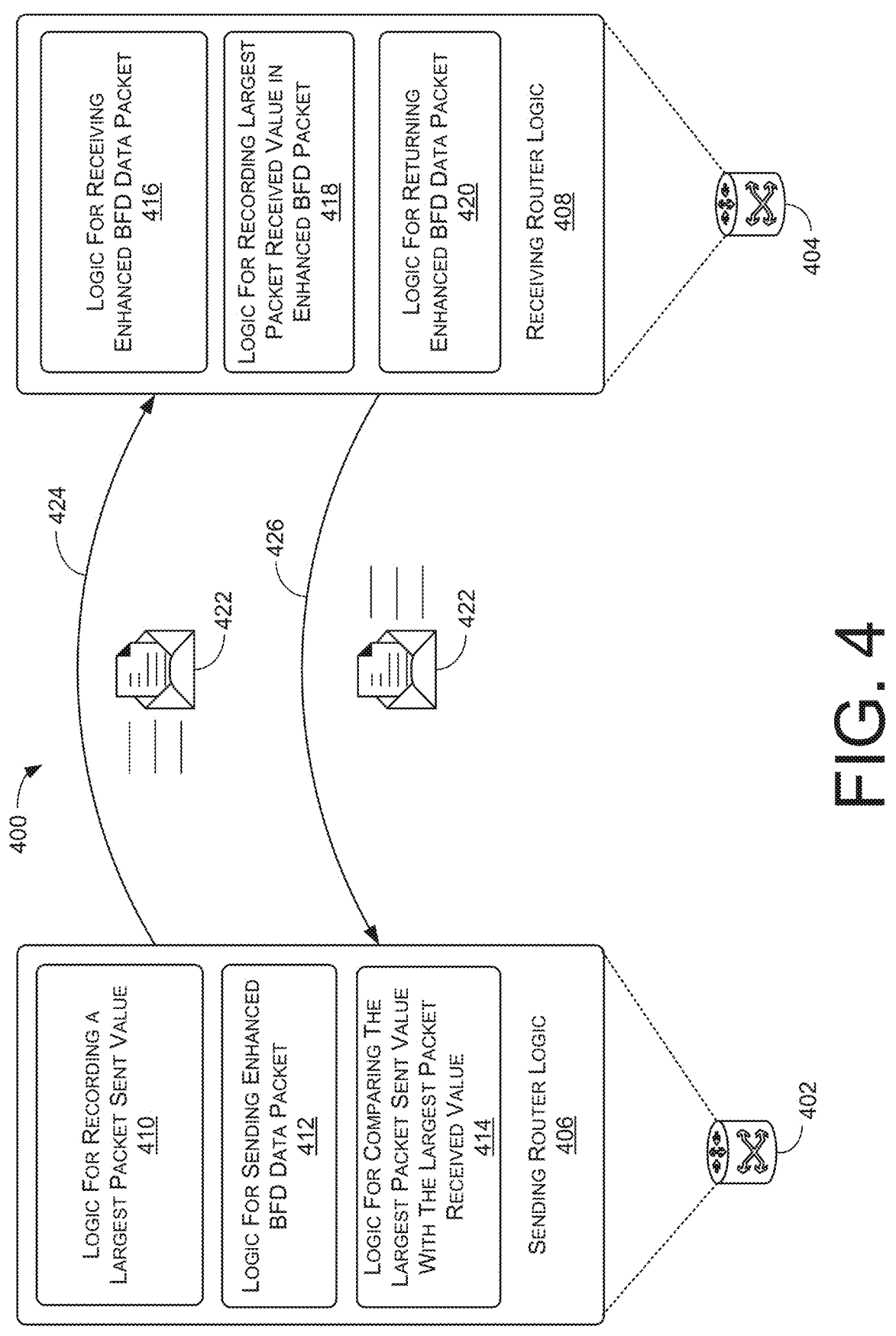
FIG. 4 illustrates a pair of network routing devices including logic and circuitry for utilizing a modified Bidirectional Data Packet to detect a change in PMTU between the routing devices.

FIG. 4 is a schematic illustrating a computer architecture 400 for establishing an exchange between a first router 402 and a second router 404, the exchange being established to determine whether to initiate a PMTU discovery process. The router 402 is a BFD packet sending router and includes Sending Router Logic 406. The router 404 is a BFD packet receiving router and includes Receiving Router Logic 408.

The Sending Router Logic 406 includes: Logic For Recording a Largest Packet Sent Value 410 in an Enhanced BFD Data Packet 422; Logic For Sending Enhanced BFD Data Packet 412; and Logic For Comparing The Largest Packet Sent Value With the Largest Packet Received Value.

The Logic For Recording a Largest Packet Sent Value, recognizes that the Enhanced BFD Data Packet 422 is enhanced with header extensions for recording a largest packet sent value. In response to determining that the Enhanced BFD Data Packet 422 includes such a header extension, the Logic For Recording a Largest Packet Sent Value 410 records a value of the largest data packet sent from the router 402 to the router 404 in the header extension of the Enhanced BFD Data Packet 422.

The Logic For Sending Enhanced BFD Data Packet 412 sends the Enhanced BFD Data Packet 422 from the router 402, to the router 404 as represented by arrow 424. The Enhanced BFD Data Packet 422 can be sent over a computer network such as the network 106 described above with reference to FIGS. 1 and 2. In one embodiment, the network 106 can be a Wide Area Network (WAN), such as the Internet. The Enhanced BFD Data Packet 422 can also be sent over a Software Defined Wide Area Network (SD-WAN), and can be transported through a virtual data tunnel, or SDWAN data tunnel such as the data tunnel 306 described above with reference to FIG. 3. SDWAN can support dynamic on-demand tunnels between two SDWAN spoke devices, such as the routers 402, 404 of FIG. 4, routing devices 102, 104 of FIGS. 1 and 2, or routers 308, 310 of FIG. 3. In one embodiment, the tunnels can be set only when there is traffic between the two devices (e.g., routers 402, 404). The data tunnel can be established as an Internet Protocol Security (IPSec) data tunnel. IPSec is a set of standards and protocols developed to support communication as packets of information are transported from an IP address across network boundaries and vice versa. The Enhanced BFD Data Packet 422 is received by the router 404 and processed by the Receiving Router Logic 408.

The Logic For Receiving Enhanced BFD Data Packet 416 receives and processes the Enhanced BFD Data Packet 422. The Logic For Receiving Enhance BFD Data Packet 416 recognizes that the Enhanced BFD Data Packet 422 has a header extension for recording a largest packet sent field and a largest packet received field. The Logic For Receiving Enhanced BFD Data Packet 416 employs the Logic For Recording Largest Packet Received Value in Enhanced BFD Packet 418 to record a largest packet received value in the appropriated header field of the Enhanced BFD Data Packet 422. The largest packet received value can stored in and retrieved from computer memory resident on the router 404. This memory could be solid state memory, CPU memory Application Specific Integrated Circuit (ASIC) memory, magnetic memory or some other form of computer readable memory.

After the largest data packet received value is entered into the appropriate header field of the Enhanced BFD Data Packet 422, the Logic For Returning Enhanced BFD Data Packet 420) returns the Enhanced BFD Data Packet 422 by sending the Enhanced BFD Data Packet from the router 404 back to the router 402 as indicated by arrow 426. Again, the Enhanced BFD Data Packet 422 can be transmitted via a network such as the network 106 of FIGS. 1 and 2 or could be transmitted over a data tunnel such as the tunnel 306 of FIG. 3. The network (e.g., network 106) can be a Wide Area Network (WAN) such as the Internet. The data tunnel (e.g., tunnel 306) can be an SDWAN data tunnel or IPSec data tunnel as described above.

Upon returning to the router 402, the Logic For Comparing The Largest Packet Sent Value With The Largest Packet Received Value performs an analysis on the information contained in the enhanced headers of the enhanced BFD Data Packet. This analysis includes comparing the largest packet sent value with the largest packet received value. If the largest packet sent value and the largest packet received value are the same, then it can be concluded that there has not been a path change resulting in a reduction in Path Maximum Transfer Unit (PMTU). In that case no extra PMTU discovery process needs to be performed, and the PMTU discovery process can be performed at the next regularly scheduled interval (e.g., every 20 minutes).

On the other hand, if the largest packet sent value recorded in the header of the Enhanced BFD Data Packet 422 exceeds the largest packet received value recorded in the Enhanced BFD Data Packet 422, then can be considered as an indication that there has been a reduction in PMTU, for example as a result of a change in network path from the router 402, to the router 404. The reduction in PMTU could have resulted in a packet being fragmented by a device or router on the patch between the router 402, and router 404. In that case, a packet that exceeded the new lower PMTU was fragmented into multiple smaller packets that, then had to be de-fragmented at the destination router 404, resulting reduced performance time and increased CPU usage. Alternatively, the reduction in PMTU could have resulted in a packet being dropped completely if that packet exceeded the PMTU value for the new path. This can happen if a device such as a router along the path does not support packet fragmentation or if that device or router has the ability to support packet fragmentation but has that feature disabled for some reason.

If the Logic For Comparing the Largest Packet Sent Value With the Largest Packet Received Value 414 determines that the largest packet sent value exceeds the largest packet received value, then a PMTU discover process can be initiated. The PMTU discover process can determine the actual value of the current PMTU for the new path from the router 402 to the router 404. The hardware and/or software of the router 402 can then be adjusted so that the router 402 only sends data packets that do not exceed the new PMTU value, thereby preventing data loss or reduced network performance.

Figure 5:
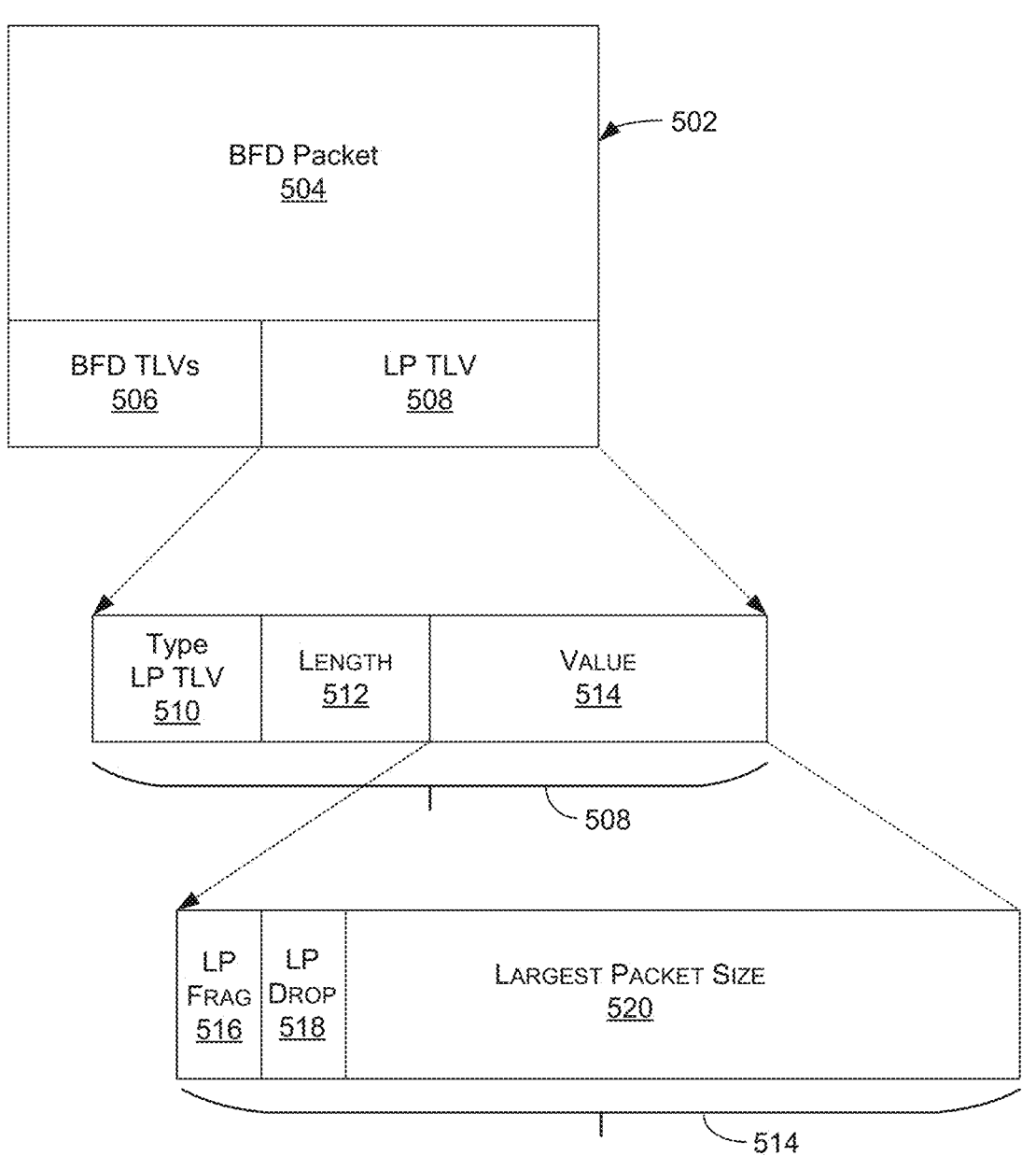
FIG. 5 illustrates a configuration of a modified Bidirectional Data Packet (BFD) having a packet header configured to recording a largest packet sent value and a largest packet received value.

FIG. 5 illustrates a Bidirectional Forwarding Detection Data Packet (BFD data packet) 502. The BFD data packet 502 can be employed as the Enhanced BFD Data Packet 422 of FIG. 4, BFD data packet 114 of FIGS. 1 and 2, or BFD data packet 316 of FIG. 3. The BFD packet 502 includes a packet body 504, a Bidirectional Forwarding Detection Type Length Value header (BFD TLVs) 506, and a Largest Packet Type Length Value field (LP TL V field) 508.

The LP TLV field 508, shown in expanded form below; includes a Type field indicating that the type is a Largest Packet Type Length Value (Type LP TLV field) 510, as well as a Length field 512, and a Value field 514. The Type LP TLV field 510 indicates that the Length field 512 records the length of a largest packet, and the Value field 514 records a value of the largest packet.

The Value field 514 is shown expanded and in greater detail below the Value field 514. The Value field 514 includes Largest Packet Size field 520 for recording the largest packet size value. The Value field also includes a Largest Packet Fragmentation field (LP Frag field) 516, and a Largest Packet Drop field (LP Drop field) 518. The LP Frag field can be used to record whether the largest packet was fragmented on its path from one router to another. The LP Drop field can be used to record whether the largest packet was dropped along its path from one router to another. In one embodiment, the LP Frag field 516 and the LP Drop field 518 can each have a size of one bit for a total of 2 bits together or the LP Frag field 518 and the LP Drop field 518. In embodiment, the Largest Packet Size field 520 can have a size of 14 bits, so that the Value field 514 can have a total size of 16 bits.

FIG. 6 illustrate a flow diagram of an example method 600 that illustrate aspects of the functions performed at least partly by the devices in the network architecture as described in FIGS. 1-5. The logical operations described herein with respect to FIG. 6 may be implemented (1) as a sequence of computer-implemented acts or program modules running on a computing system and/or (2) as interconnected machine logic circuits or circuit modules within the computing system. By way of example, the operations can be performed by one or more routers, such as routing device 102 of FIGS. 1 and 2, by one or both of routers 308, 310 of FIG. 3, or by one or both of routers 402, 404 of FIG. 4.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

With reference to FIG. 6, the method 600 includes an operation 602 that includes sending a Bidirectional Forwarding Detection (BFD) data packet from a first network device to a second network device, the BFD data packet being configured to record a largest data packet sent value and a largest data packet received value. In one embodiment, the BFD data packet can be sent by a router device of a network architecture. In one embodiment, the BFD data packet can also be generated by the sending router device. In one embodiment, the BFD data packet can be enhanced with specially configured header field extensions for recording the largest data packet sent size and the larges data packet received size.

The BFD data packet is received 604 by a second network device. In one embodiment, the second network device is router. In one embodiment, the second first and second network devices are both edge routers of a network, which can be a Software Defined Wide Area Network (SDWAN) and/or a networking architecture incorporating Internet Protocol Security (IPSec).

A determination 606 is made as to whether the largest data packet sent value is larger than the largest packet received value. This determination can be made by comparing the largest packet sent value stored in the BFD data packet with the largest packet received value also recorded in the BFD data packet. In one embodiment, the BFD data packet is sent to a networking device such as an edge router and then is returned by that device. In one embodiment, the determination as to whether the largest packet sent value exceeds the largest packet received value can be performed by logic and/or circuitry of a first network device such as an edge router that originally sent the BFD data packet and then received the returned BFD data packet.

The method includes a decision operation 608 regarding whether the largest packet sent value is larger than the largest packet received. If the answer to that question is no, the largest packet sent value is not larger than the largest packet received value, then the method returns to operation 602 to send another BFD data packet. The operation 602 can be performed after a predetermined amount of time has passed. This predetermined amount of time can be significantly less than the amount of time generally allotted between regular PMTU discovery operations. In response to determining that the answer to decision operation 608 is yes, the largest packet sent value is larger than the largest packet received value, then a determination 610 is made to perform a Path Maximum Transport Unit (PMTU) discovery process.

A yes determination can indicate that there has been a network path change that has resulted in a reduction in PMTU. In one embodiment, the PMTU discovery process can be performed by the network device or router than originally sent the BFD data packet in operation 602. The PMTU discovery process can determine the current PMTU value for the network path. The size of data packets sent can then be adjusted to fit within that PMTU value, thereby preventing data packet fragmentation and/or data packet drops.

Figure 7:
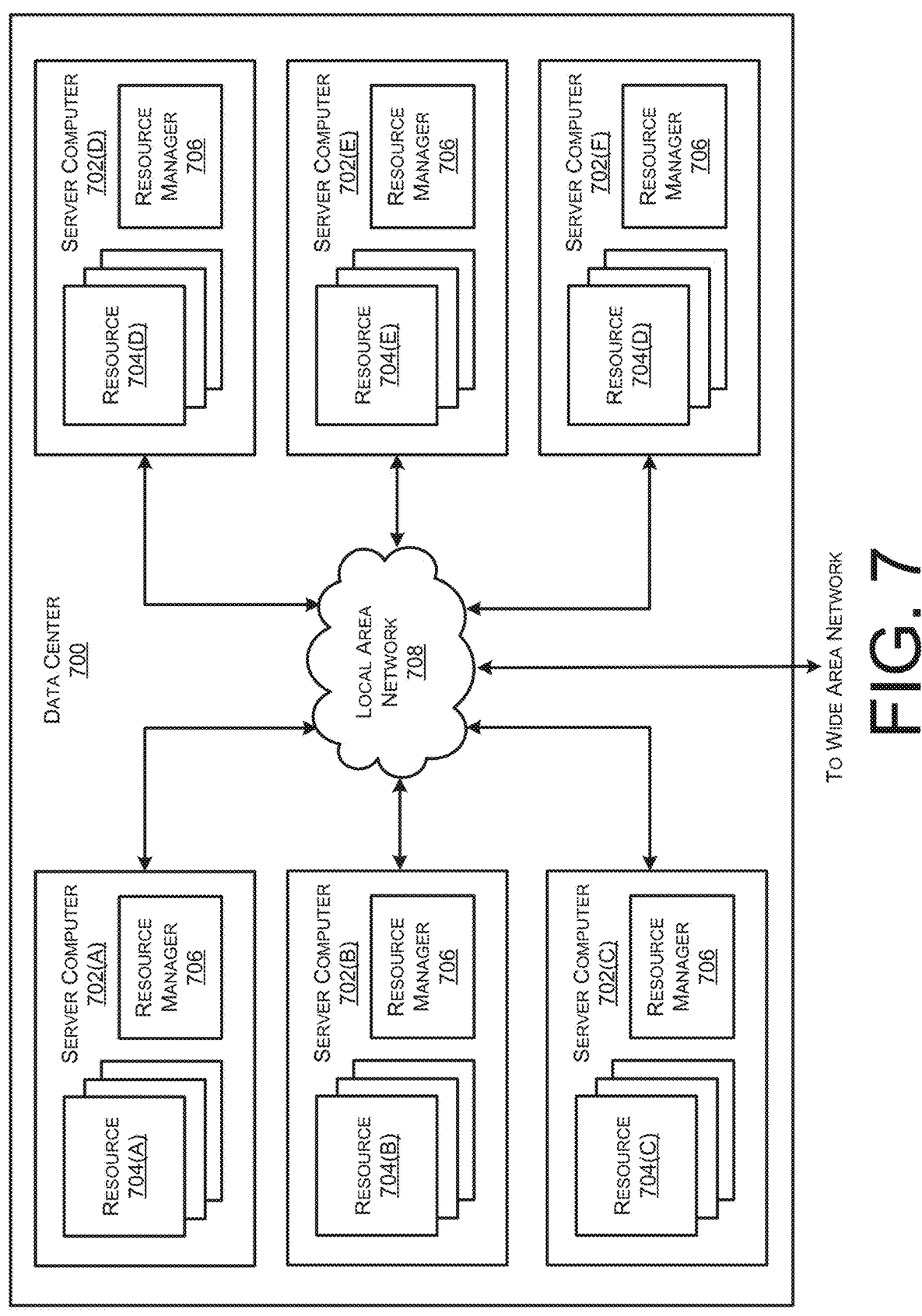
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rackmount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
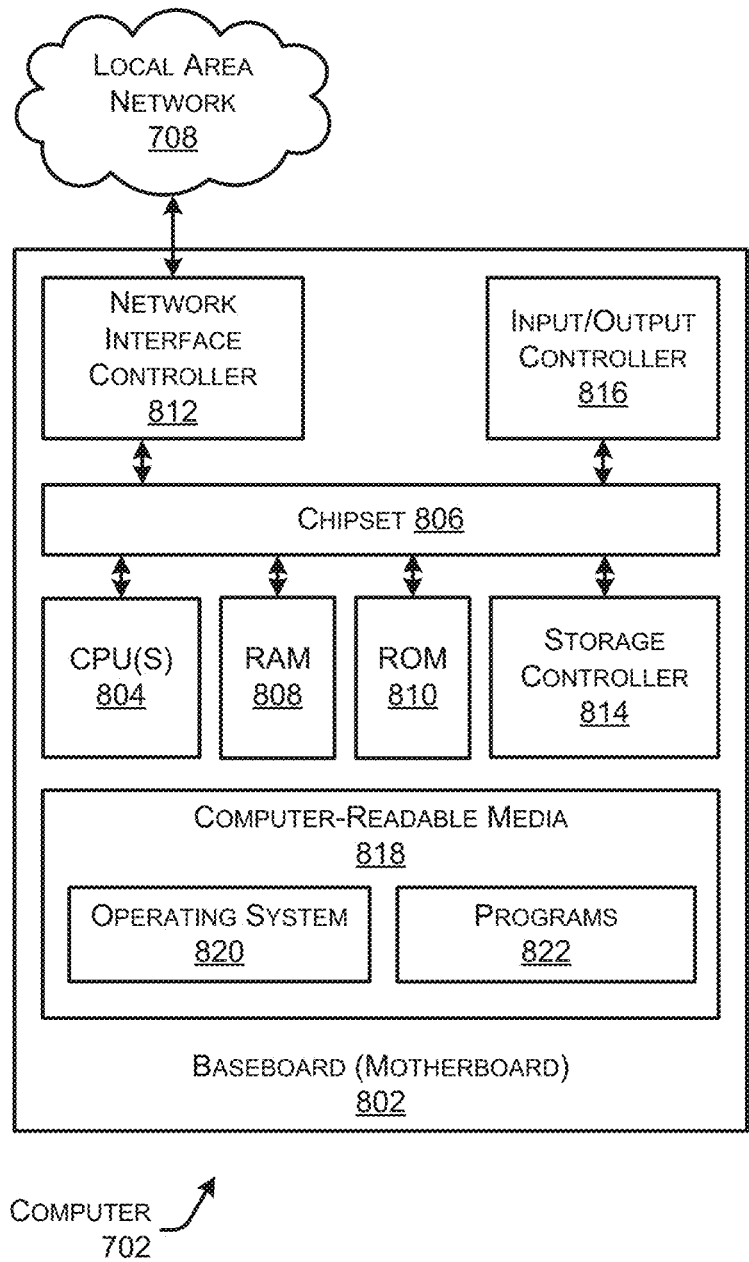
FIG. 8 is a computer architecture diagram showing an illustrative computer hardware architecture for implementing a computing device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server, and may comprise networked devices such as servers, switches, routers, hubs, bridges, gateways, modems, repeaters, access points, etc.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (and/or 106). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702. In some examples, the operations performed by devices in a distributed application architecture, and or any components included therein, may be supported by one or more devices similar to computer 702. Stated otherwise, some or all of the operations performed by the network architecture 100, 200, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more of a router, load balancer and/or server. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the router, load balancer and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for providing a distributed application load-balancing architecture that is capable of supporting multipath transport protocol. That is, the computer 702 may comprise any one of the routers, load balancers, and/or servers. The programs 822 may comprise any type of program that cause the computer 702 to perform techniques for communicating with other devices using any type of protocol or standard usable for determining connectivity.

Figure 9:
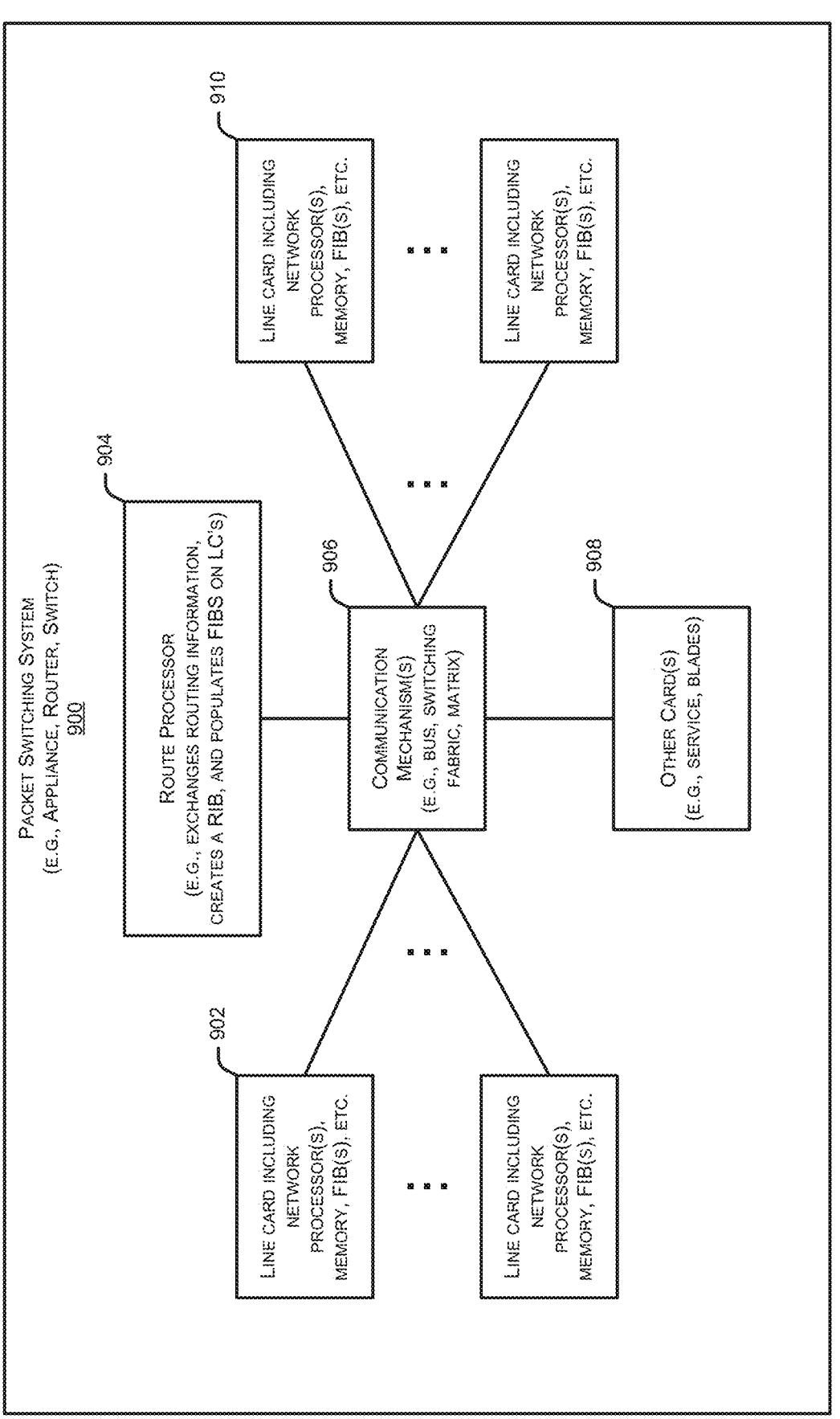
FIG. 9 illustrates a block diagram illustrating an example packet switching system that can be utilized to implement various aspects of the technologies disclosed herein.

FIG. 9 illustrates a block diagram illustrating an example packet switching device (or system) 900 that can be utilized to implement various aspects of the technologies disclosed herein. In some examples, packet switching device(s) 900 may be employed in various networks, such as, for example, network 106 as described with respect to FIG. 1.

In some examples, a packet switching device 900 may comprise multiple line card(s) 902, 910, each with one or more network interfaces for sending and receiving packets over communications links (e.g., possibly part of a link aggregation group). The packet switching device 900 may also have a control plane with one or more processing elements 905 for managing the control plane and/or control plane processing of packets associated with forwarding of packets in a network. The packet switching device 900 may also include other cards 908 (e.g., service cards, blades) which include processing elements that are used to process (e.g., forward/send, drop, manipulate, change, modify, receive, create, duplicate, apply a service) packets associated with forwarding of packets in a network. The packet switching device 900 may comprise hardware-based communication mechanism 906 (e.g., bus, switching fabric, and/or matrix, etc.) for allowing its different entities 902, 904, 908 and 910 to communicate. Line card(s) 902, 910 may typically perform the actions of being both an ingress and/or an egress line card 902, 910, in regard to multiple other particular packets and/or packet streams being received by, or sent from, packet switching device 900.

Figure 10:
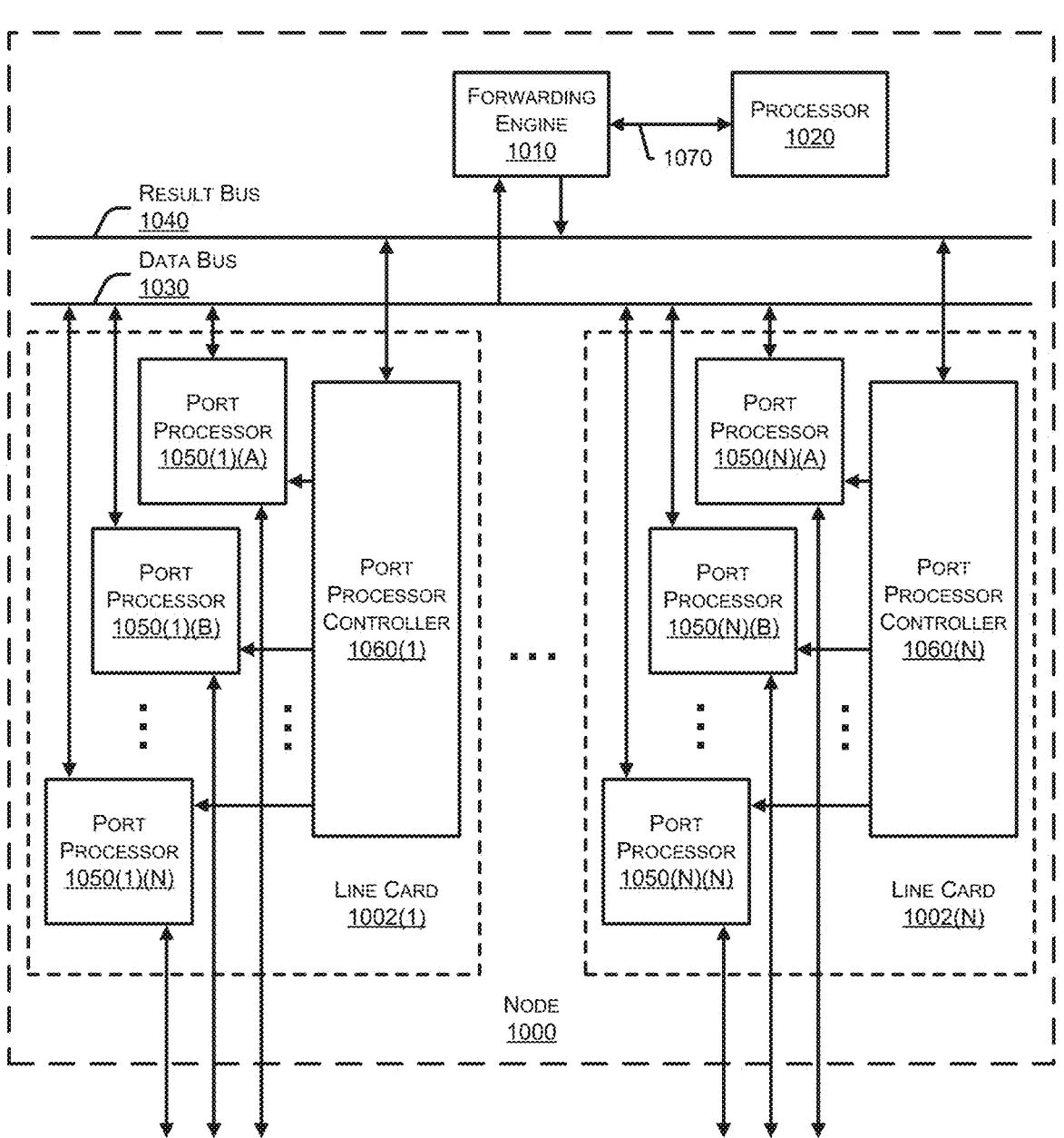
FIG. 10 illustrates a block diagram illustrating certain components of an example node that can be utilized to implement various aspects of the technologies disclosed herein.

FIG. 10 illustrates a block diagram illustrating certain components of an example node 1000 that can be utilized to implement various aspects of the technologies disclosed herein. In some examples, node(s) 1000 may be employed in various networks, such as, for example, network 106 as described with respect to FIG. 1.

In some examples, node 1000 may include any number of line cards 1002 (e.g., line cards 1002(1)-(N), where N may be any integer greater than 1) that are communicatively coupled to a forwarding engine 1010 (also referred to as a packet forwarder) and/or a processor 1020 via a data bus 1030 and/or a result bus 1040. Line cards 1002(1)-(N) may include any number of port processors 1050(1)(A)-(N)(N)

which are controlled by port processor controllers 1060(1)-(N), where N may be any integer greater than 1. Additionally, or alternatively, forwarding engine 1010 and/or processor 1020 are not only coupled to one another via the data bus 1030 and the result bus 1040, but may also communicatively coupled to one another by a communications link 1070.

The processors (e.g., the port processor(s) 1050 and/or the port processor controller(s) 1060) of each line card 1002 may be mounted on a single printed circuit board. When a packet or packet and header are received, the packet or packet and header may be identified and analyzed by node 1000 (also referred to herein as a router) in the following manner. Upon receipt, a packet (or some or all of its control information) or packet and header may be sent from one of port processor(s) 1050(1)(A)-(N)(N) at which the packet or packet and header was received and to one or more of those devices coupled to the data bus 1030 (e.g., others of the port processor(s) 1050(1)(A)-(N)(N), the forwarding engine 1010 and/or the processor 1020). Handling of the packet or packet and header may be determined, for example, by the forwarding engine 1010. For example, the forwarding engine 1010 may determine that the packet or packet and header should be forwarded to one or more of port processors 1050(1)(A)-(N)(N). This may be accomplished by indicating to corresponding one(s) of port processor controllers 1060(1)-(N) that the copy of the packet or packet and header held in the given one(s) of port processor(s) 1050(1)(A)-(N)(N) should be forwarded to the appropriate one of port processor(s) 1050(1)(A)-(N)(N). Additionally, or alternatively, once a packet or packet and header has been identified for processing, the forwarding engine 1010, the processor 1020, and/or the like may be used to process the packet or packet and header in some manner and/or may add packet security information in order to secure the packet. On a node 1000 sourcing such a packet or packet and header, this processing may include, for example, encryption of some or all of the packets or packet and header's information, the addition of a digital signature, and/or some other information and/or processing capable of securing the packet or packet and header. On a node 1000 receiving such a processed packet or packet and header, the corresponding process may be performed to recover or validate the packets or packet and header's information that has been secured.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for detecting changes in path maximum transfer unit (PMTU) of network paths of a network, the method comprising:
   generating, by a first network device, a Bidirectional Forwarding Detection (BFD) data packet configured to detect changes in a network path and including an extension in a header of the BFD data packet configured to record a first size of a largest data packet sent from the first network device and a second size of a largest data packet received at a second network device;
sending, by the first network device, the BFD data packet to the second network device, wherein the BFD data packet records the first size at the first network device and the second size at the second network device;
receiving, by the first network device and from the second network device, the BFD data packet;
determining, based on the extension and detecting a difference between the first size and the second size, a change in a PMTU of the network path; and
in response to determining the change, performing a PMTU discovery of an updated PMTU of a new network path associated with the change.

2. The method as in claim 1, further comprising:
determining, based on the PMTU discovery, a value of the updated PMTU; and
causing at least one of the first network device or the second network device to change a size of data packets.

3. The method as in claim 1, further comprising determining, based on the determining the difference between the first size and the second size, that fragmentation of data packet has occurred at one or more devices in the network.

4. The method as in claim 1, further comprising, determining, based on the first size exceeding the second size, that a device of the network dropped at least one data packet, wherein performing the PMTU discovery is in response to determining that the at least one data packet is dropped.

5. The method as in claim 1, further comprising, in response to determining the difference, determining that the change in the network path has resulted in a reduction in the PMTU.

6. The method as in claim 1, further comprising:
sending, between the first network device and the second network device, a second BFD data packet comprising a second extension;
determining, based at least in part on the second extension, that a second PMTU is unchanged; and
in response to determining the PMTU is unchanged, refraining from initiating a second PMTU discovery.

7. The method as in claim 1, further comprising:
recording, in the extension and by the first network device, the first size;
sending, the BFD data packet to the second network device;
receiving the BFD data packet by the second network device;
recording, in the extension and by the second network device, the second size; and
sending the BFD data packet over the network from the second network device to the first network device.

8. A networking system comprising:
one or more processors; and
one or more non-transitory computer-readable media storing computer-executable instructions that, when executed by the one or more processors, cause the one or more processors to perform operations comprising:
   generating a Bidirectional Forwarding Detection (BFD) data packet configured to detect changes in a network path of a network and including an extension in a header of the BFD data packet configured to record a first size of a largest data packet sent from a first network device and a second size of a largest data packet received at a second network device;

sending, via the network, the BFD data packet between the first network device and the second network device;

determining a change in a path maximum transfer unit (PMTU) of the network path, the change being based in part on determining a difference between the first size and the second size; and in response to determining the change, performing a PMTU discovery of an updated PMTU.

9. The networking system as in claim 8, the operations further comprising:

determining, based on the PMTU discovery, a value of the updated PMTU; and causing at least one of the first network device or the second network device to change a size of data packets.

10. The networking system as in claim 8, the operations further comprising determining, based on the determining the difference between the first size and the second size, that fragmentation of a data packet has occurred at one or more devices in the network.

11. The networking system as in claim 8, the operations further comprising, determining, based on the first size exceeding the second size, that a device of the network dropped at least one data packet, wherein performing the PMTU discovery is in response to determining that the at least one data packet is dropped.

12. The networking system as in claim 8, the operations further comprising, in response to determining the difference, determining that the change in the network path has resulted in a reduction in the PMTU.

13. The networking system as in claim 8, the wherein the operations are performed at one or more of the first network device or the second network device, the operations further comprising detecting the change in the network path in real time.

14. The networking system as in claim 8, the operations further comprising:

recording, in the extension and by the first network device, the first size;

sending, the BFD data packet to the second network device;

receiving the BFD data packet by the second network device;

recording, in the extension and by the second network device, the second size; and sending the BFD data packet over the network from the second network device to the first network device.

15. One or more non-transitory computer-readable media storing computer-executable instructions that, when executed by one or more processors, cause the one or more processors to perform operations comprising:

generating a Bidirectional Forwarding Detection (BFD) data packet configured to detect changes in a network path of a network and including an extension in a header of the BFD data packet configured to record a first size of a largest data packet sent from a first network device and a second size of a largest data packet received at a second network device;

sending, via the network, the BFD data packet between the first network device and the second network device, wherein the BFD data packet records the first size of the largest data packet sent from the first network device and the second size of the largest data packet received at the second network device;

determining, based on the extension, a change in a path maximum transfer unit (PMTU) of the network path, the change being based in part on determining a difference between the first size and the second size; and in response to determining the change, performing a PMTU discovery of an updated PMTU of a new network pathway associated with the change.

16. The one or more non-transitory computer-readable media as in claim 15, the operations further comprising:

determining, based on the PMTU discovery, a value of the updated PMTU; and causing at least one of the first network device or the second network device to change a size of data packets.

17. The one or more non-transitory computer-readable media as in claim 15, the operations further comprising determining, based on the determining the difference between the first size and the second size, that fragmentation of a data packet has occurred at one or more devices in the network.

18. The one or more non-transitory computer-readable media as in claim 15, wherein the operations are performed at one or more of the first network device or the second network device, the operations further comprising detecting the change in the network path in real time.

19. The one or more non-transitory computer-readable media as in claim 15, the operations further comprising, in response to determining the difference, determining that the change in the network path has resulted in a reduction in the PMTU.

20. The one or more non-transitory computer-readable media as in claim 15, the operations further comprising:

recording, in the extension and by the first network device, the first size;

sending, the BFD data packet to the second network device;

receiving the BFD data packet by the second network device;

recording, in the extension and by the second network device, the second size; and sending the BFD data packet over the network from the second network device to the first network device.

* * * * *